United States Patent [19]

Neukom

[11] 4,117,891
[45] Oct. 3, 1978

[54] GROUND DRIVE FOR GRAIN DRILLS

[75] Inventor: Chester G. Neukom, Jamestown, N. Dak.

[73] Assignee: Haybuster Manufacturing, Inc., Jamestown, N. Dak.

[21] Appl. No.: 779,338

[22] Filed: Mar. 21, 1977

[51] Int. Cl.² ............................................. A01B 33/00
[52] U.S. Cl. ...................................... 172/105; 74/13; 111/85; 180/74
[58] Field of Search ........................ 111/78, 83, 84, 85, 111/86; 172/105, 106; 74/13, 14; 180/53 WA, 74, 14 R

[56] References Cited

U.S. PATENT DOCUMENTS

| | | | |
|---|---|---|---|
| 601,017 | 3/1898 | Hudson | 111/85 |
| 1,878,407 | 9/1932 | Kaupke | 111/83 |
| 2,096,910 | 10/1937 | McIntosh | 74/13 |
| 2,739,549 | 3/1956 | Taylor | 111/9 |
| 2,869,491 | 1/1969 | Orendorff | 111/86 |
| 3,208,536 | 9/1965 | Orendorff | 172/105 X |
| 3,213,698 | 10/1965 | Gandrud | 172/105 X |
| 3,312,288 | 4/1967 | Cervenka | 172/105 X |
| 3,422,908 | 1/1969 | Blake | 172/106 |
| 3,705,560 | 12/1972 | Lappin | 111/85 |
| 3,841,245 | 10/1974 | Tye | 111/85 |
| 3,990,721 | 11/1976 | Hoffman | 180/14 R |

*Primary Examiner*—Edgar S. Burr
*Assistant Examiner*—James R. Feyrer
*Attorney, Agent, or Firm*—Nickolas E. Westman

[57] ABSTRACT

A drive roller for driving feeding and metering mechanisms for seed and fertilizer of a grain drill which utilizes a drive roller riding against a pair of castering frame support wheels that are independent of the press wheel assemblies for the grain drill. The roller provides satisfactory drive where individual depth control of each of the furrow openers is utilized. The drive is adapted for use on a wide variety of different drills.

12 Claims, 4 Drawing Figures

GROUND DRIVE FOR GRAIN DRILLS

BACKGROUND OF THE INVENTION

1. Field of the Invention

The present invention relates to drive arrangements for metering mechanisms used in grain drills and fertilizer applicators.

2. Prior Art

In the prior art, it is quite common to have a ground drive for the seed metering mechanisms used in grain drills or planters. The drive usually is taken from a shaft axle for a gang of press wheels (several press wheels mounted on a common shaft) and operates through suitable drives to drive the metering wheels in the grain drill box and a fertilizer applicator box. Sprocket and chain speed change devices are quite commonly used for changing the speed of rotation of the metering wheels with respect to the ground speed so that the rate of seeding can be controlled.

Examples of devices which use ground drives for the seed metering mechanisms are found in U.S. Pat. No. 2,869,491 which is an attachment for a planter, but does illustrate a drive from a ground wheel 23, and U.S. Pat. No. 2,739,549 also shows a ground drive from a support wheel 23. The drives come from opposite sides of the seeding devices, and use a well known chain and sprocket drive for the metering wheels or devices.

SUMMARY OF THE INVENTION

The present invention relates to a drive for the metering mechanism of a grain drill and fertilizer applicator which is responsive to ground speed, and which provides a drive independent of the press wheels or packer wheels used for covering the seed.

In the form shown, the grain drill is supported on a frame that has a dual caster wheel assembly in the center forward part of the drill, while the rear parts of the frame are supported independently on wheels. The ground drive comprises an elongated roller that engages both of the dual wheels of the caster assembly and which is spring loaded against these wheels. The roller provides a rotating power shaft which is proportional in speed to the speed of movement across the ground.

The axial length of the drive roller is sufficient so that it engages both of the dual wheels during normal, straight ahead operation, and as the drill is turned, at least one of the caster wheels will continue to engage the roller and provide a driving force.

The down pressure mechanism, which urges the roller against the caster wheels includes a spring loaded through a control tube that also regulates the down pressure on the furrow opener assemblies in the form shown.

The roller is covered with suitable material that makes the surface irregular to provide for a higher driving force from the roller.

DESCRIPTION OF THE PREFERRED EMBODIMENT

Figure 1:
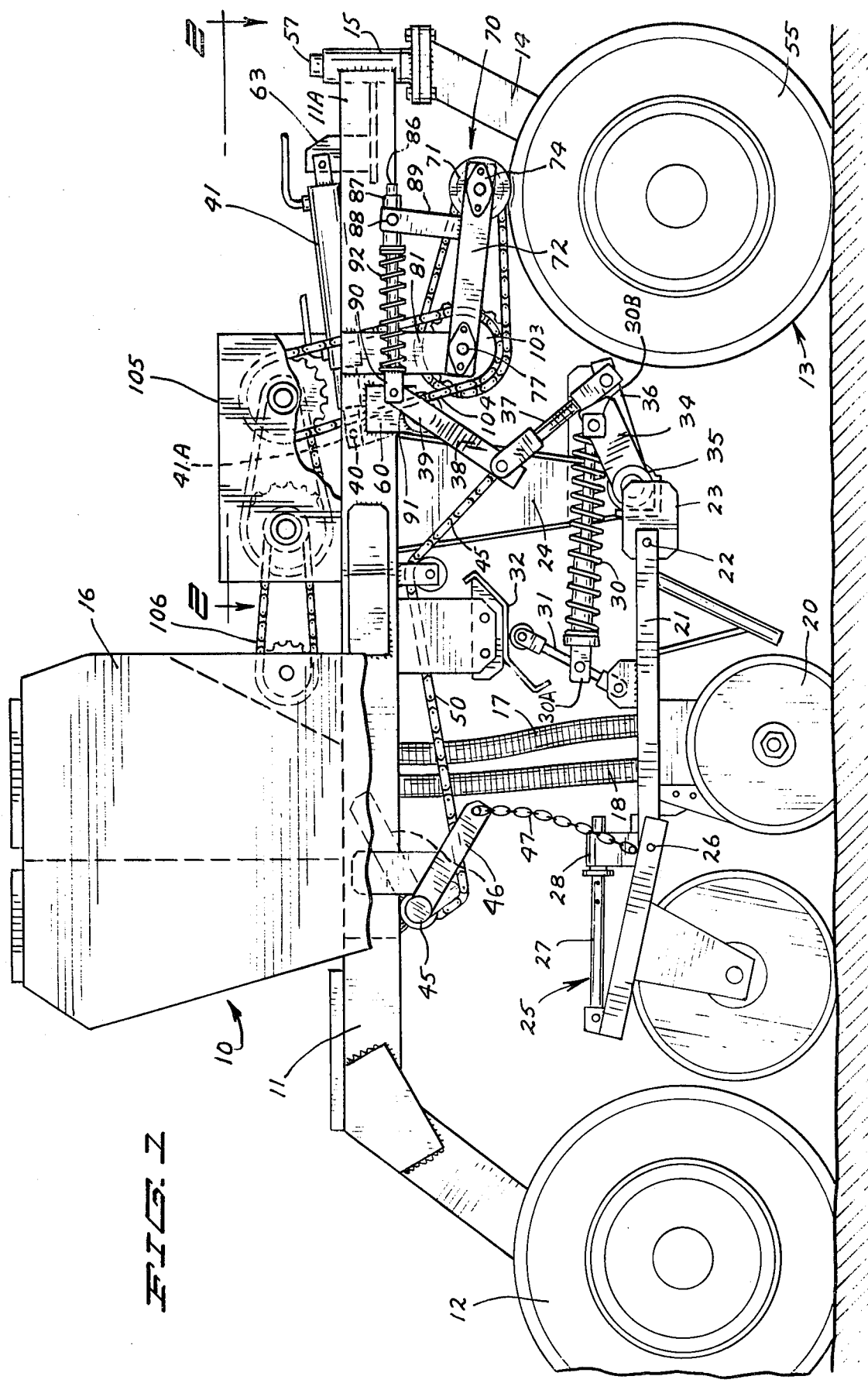
FIG. 1 is a side elevational view of a typical grain drill assembly having a ground drive mechanism made according to the present invention installed thereon.

The grain drill illustrated generally at 10 comprise a main frame 11 which is supported at its rear portions by suitable spaced apart wheels 12 (there are at least two rear wheels spaced laterally across the width of the drill) and is supported at its forward end with a caster wheel assembly 13. The caster wheel assembly has dual wheels and includes a support 14 that is pivotally mounted about a vertical axis in a housing 15 at the forward end of the frame 11.

The frame 11 supports a drill box assembly 16, which has a compartment for fertilizer and one for seed, and which fertilizer and seed are metered by conventional metering devices through grain tubes 17 and fertilizer tubes 18. The metering apparatus, which is not shown, can be of any desired conventional type. In the usual drill, a rotating feed wheel meters the grain and fertilizer into the tubes 17 and 18.

These grain and fertilizer tubes 17 and 18 lead down to a furrow opener assembly 20 which is of the conventional double disc type. Each furrow opener assembly 20 is mounted onto a subframe 21 that is pivotally mounted as at 22 to a cross frame 23. The cross frame 23 comprises an angle iron member that extends across the frame 11 and is supported from the upper portions of the frame 11 with downwardly depending supports 24.

The individual furrow opener assemblies 20 are controlled as to depth through a depth control, press wheel mechanism 25 that is pivotally mounted to the rear of the subframe 21 as at 26, and can be adjusted by changing the stopped position of a telescoping rod 27 that telescopes relative to a support 28 carried on the frame 21.

Down pressure on the furrow opener assemblies 20 is controlled through a spring 30 that acts through a lever 31 which has a roller at one end that rides against a support track 32. The lever 31 has its other end pivotally mounted as at 33 to the subframe 21. The force on the spring 30 is controlled through the use of arms 34 that are mounted onto a cross rock shaft 35, which rock shaft is controlled in rotational position through the use of a lever 36, a link 37 and a second lever 38. The second lever 38 is mounted onto a rotatable cross tube 39 that is controlled in rotation through the use of a lever 40 and a double acting hydraulic cylinder 41, so that retraction of the rod of cylinder 41 will cause the link 37 to pull on the lever 36, moving the arms 34 in counterclockwise direction and loading the springs 30 to control the force on the furrow openers 20. The spring is mounted on a rod that is connected to lever 31 through a pivoting rod end 30A and which rod is slidably mounted in a block 30B carried by the arms 34 so that the arms exert pressure on the spring 30.

Also the lifting of the furrow opener assemblies is controlled through a rock shaft 45 that lifts a lever 46 which in turn pulls a chain 47 upwardly and lifts the individual furrow opener assemblies. The rock shaft 45 is controlled by a chain 50 that is connected through suitable guides to the lever 38, and when the cylinder 41 is extended the lever 38 will move in counterclockwise direction pulling on the chain 50 and rotating the shaft 45 and lever 46 to place tension in the chain 47 and lift the furrow opener assemblies. There is one chain 47 and one lever 46 for each furrow opener assembly.

The cylinder 41 has a rod end 41A that is extendable and retractable with the rod, which is attached to the double acting piston. The rod end is attached to lever or arm 40 which is attached to the tube 39.

Figure 2:
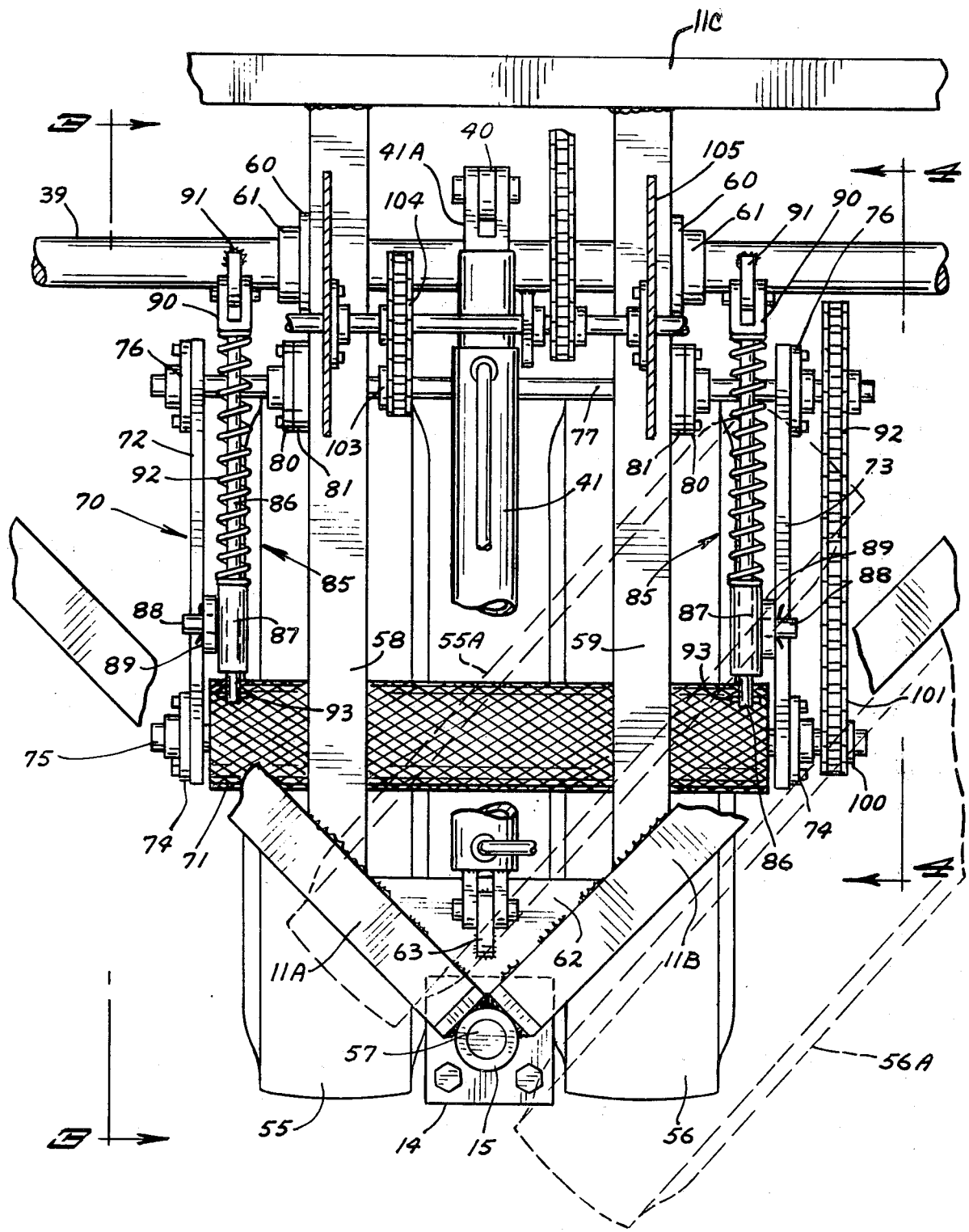
FIG. 2 is a fragmentary enlarged top plan view of the forward portions of the frame of FIG. 1.
Figure 3:
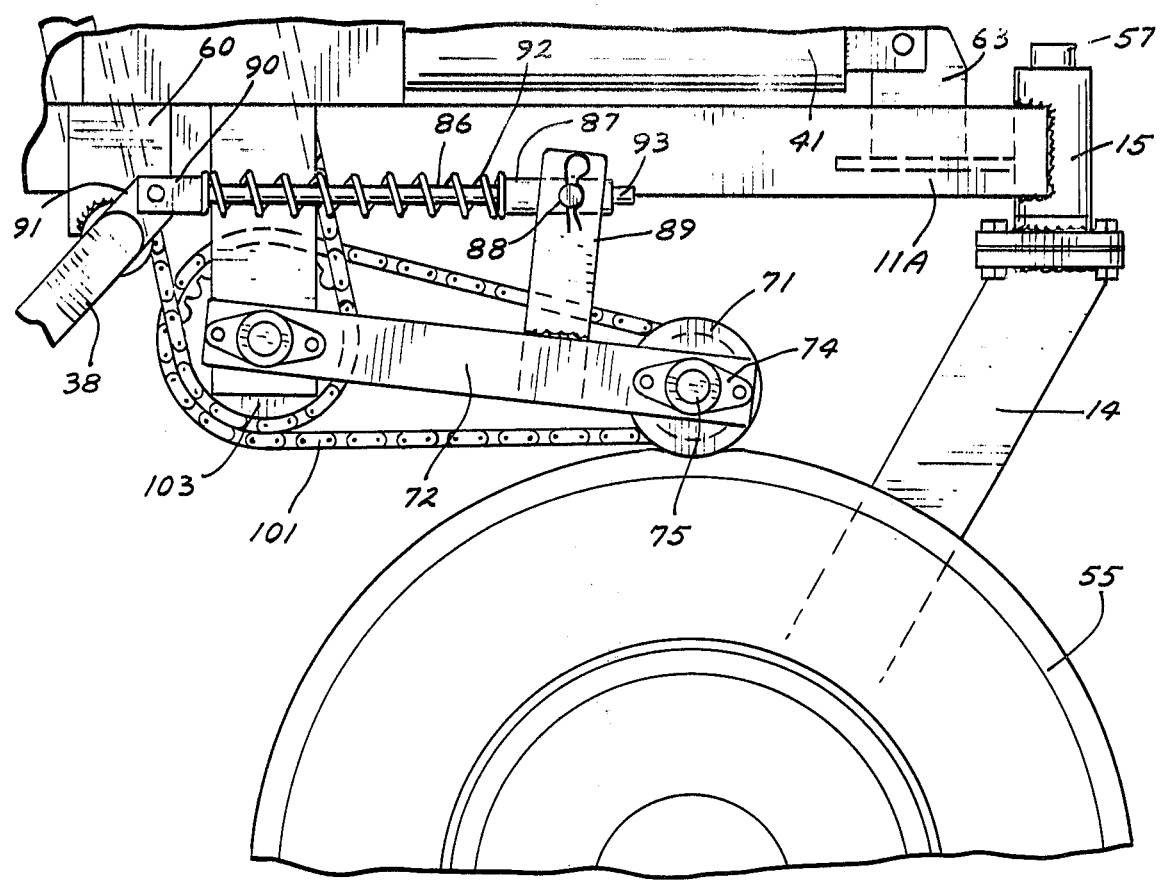
FIG. 3 is a side elevational view taken as on line 3—3 in FIG. 2 with parts in section and parts broken away.
Figure 4:
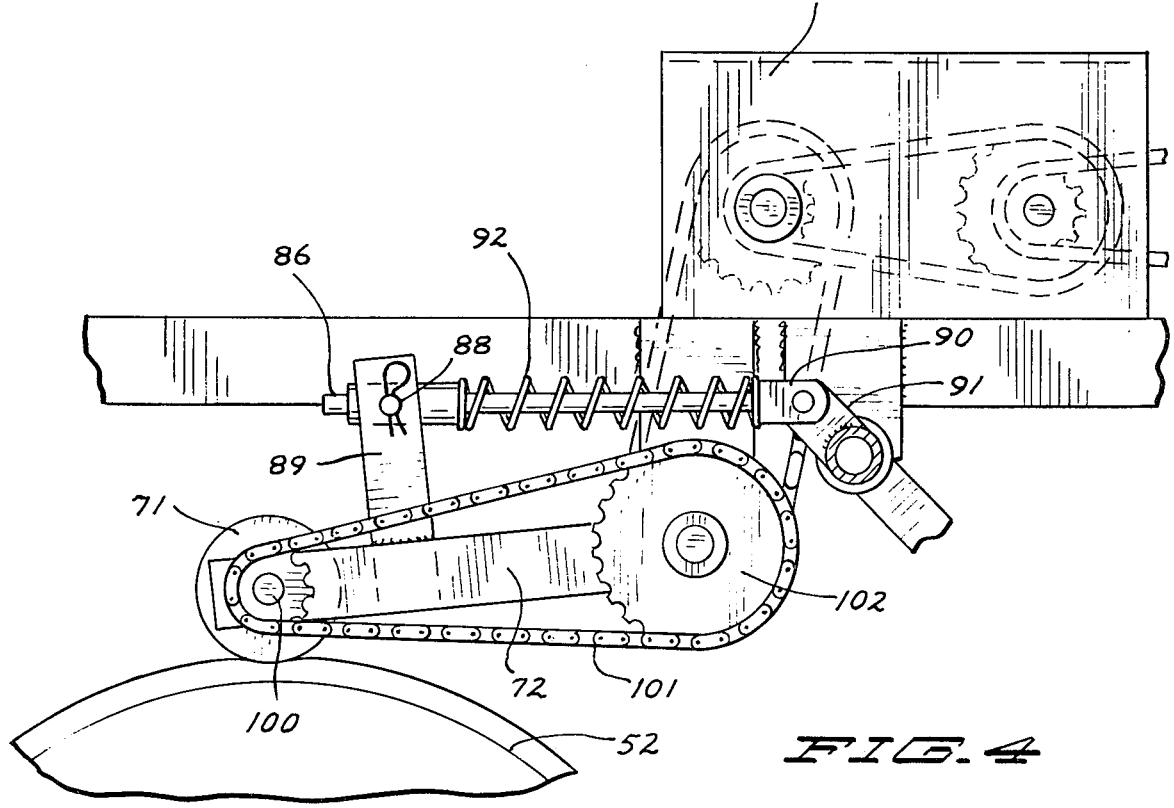
FIG. 4 is a side view of the drive roller taken from an opposite side of FIG. 3.

Referring now to FIG. 2, the caster assembly 13 as shown, includes the first and second dual wheels 55 and 56, and as shown the support 14 is mounted onto a shaft 57 that rotates in the sleeve or tube 15. The tube 15 is attached to a pair of rearwardly extending frame members 11A and 11B, that form a portion of the frame 11, and these frame members are held together with suitable cross members such as cross member 11C which is shown fragmentarily. Fore and aft extending braces 58 and 59 are fixed to the frame members 11A and 11B, and to the cross member 11C, as shown. These braces 58 and 59 have downwardly depending supports 60 that carry tubular sleeves 61, which rotatably support the tube 39 for rotation under control of the cylinder 41 and the rod end 41A. A suitable cross member 62 is provided and carries an upright ear 63 for supporting the base of cylinder 41 in position at the front of the frame.

The ground drive assembly for the unit, illustrated generally at 70 comprises a drive roller 71 that is mounted on a pair of pivot arms 72 and 73, and suitable bearings indicated at 74 rotatably mount the roller on these arms. The roller has a central shaft 75 that is mounted in the bearings, as shown. The rear portions of the arms 72 and 73 are mounted through suitable bearings 76 to a cross shaft 77. The bearings 76 permit the shaft 77 to rotate, and also therefore permit the arms 72 and 73 to rotate or pivot relative to the shaft 77. The shaft 77 in turn is also mounted in a pair of support bearings 80, 80 each of which is mounted on a vertical support member 81 attached to the respective fore and aft extending frame members 57 and 58. The shaft 77 is free to rotate on the bearings 80, and also to pivot relative to the bearings. The roller 71 is urged down against the pneumatic tires that are carried by the wheels 55 and 56, through the use of spring actuator assemblies illustrated generally at 85. Each of the actuator assemblies comprises a central rod 86 that is telescopically mounted in a tube 87. The tubes 87 are provided with pivot shafts 88 that are pivotally mounted in upright members 89 that are fixed to the arms 72 and 73, respectively.

The rods 86 each have a rod end member 90 at an opposite end thereof from the sleeves 87, and the rod end members are pivotally connected to ears 91, one on each side of the respective frame members 58 and 59. The ears 91 are welded or otherwise suitably attached to the tube 39 which is controlled by the cylinder 41. A spring 92 is mounted over each of the rods 86, and acts between the rod end 90 and the sleeve 87 of each respective spring loading device. The springs 92 are compression springs.

When the tube 39 is rotated to a working position as shown in FIG. 1, the springs 92 provide a force acting against the sleeves 87, and through the pins 88 and upright members 89. A moment is thus exerted on the arms 72 and 73, respectively, tending to rotate these arms and urge the roller 71 downwardly against the tires mounted on the wheels 55 and 56. The amount of force of course is controlled by the rotation of the tube 39, and the size and rate of the springs 92.

When the furrow openers are to be lifted, the rod end 41A is extended, the tube 39 rotates in counterclockwise direction, and the ears 91 also rotate in counterclockwise direction, and thereby tend to pull on the rod ends 90 and the rods 86. A suitable pin 93 is provided on each of the rods 86 on the opposite end of the respective sleeve 87 from the springs 92, and this pin then will exert a lifting force on the sleeves 87 tending to lift the arms 72 and 73 upwardly and thus take the roller 71 out of engagement with the tires on the wheels 55 and 56.

Thus the roller 71 is automatically lifted out of a driving engagement whenever the furrow opener assemblies 20 are lifted upwardly.

The shaft 75 for the roller 71 has a drive sprocket 100 drivably mounted thereon. A chain 101 is driven by the sprocket 100, and this in turn drives a second sprocket 102 that is drivably mounted onto the shaft 77. Because the shaft 77 is mounted in bearings relative to the arms 73, and also in bearings 80 relative to the support frame, the shaft 77 can be rotated while still permitting the arms 72 and 73 to pivot.

A second sprocket 103 is drivably mounted onto the shaft 77, and drives a chain 104 which leads to a drive shaft on a speed change drive assembly indicated at 105. The shaft 77 is a driven shaft that rotates proportional to ground speed and may be used to drive any desired mechanism. As shown, however, the speed change drive 105 in turn may have a chain 106 leading to drive the rotating feed metering wheels of the grain drill assembly.

The speed change drive can be any desired type of device, comprising an arrangement which has several different size sprockets mounted on two spaced shafts, and whereby a chain can be mounted between selected aligning sprockets, each set of which will provide different output speed for changing the drive ratio between the two shafts. The speed change also could be a gear speed reduction device such as a gear box, or any suitable speed change drive which would permit changing the speed of the output chain 106 to relate the ground speed of the vehicle to a desired feeding rate. Speed change mechanisms are well known in the art and used widely in grain drills at the present time.

In operation, the down pressure of the roller 71 against the tires on the wheels 55 and 56 is made to cause a sufficient driving engagement so that the roller 71 will be rotated as the wheels 55 and 56 roll along the ground. The roller 71, as shown, can be covered with a layer of expanded metal to provide a rough surface of the roller that will not slip as easily when wet or caked with mud. It should also be noted that as the swivel or caster wheels move laterally, during turning, as indicated by the dotted lines 55A and 56A, one of the tires and wheels can move completely clear of the roller 71 while the other tire and wheel will continue to engage the roller and will tend to drive it, but at a slightly different rate than straight ahead movement. In this way, the roller 71 will not drop off the dual caster wheels during normal turning but will always be carried by at least one of the wheels when it is in driving engagement and the drill mechanism is being turned during use. The roller 71 rotates easily and will continue to operate during turns.

The center line of the shaft 75 is substantially vertically above the axis of rotation of the wheels 55 and 56. The axis of the shaft 57 is ahead of the roller axis as shown. The lateral width of the dual caster wheels is such that even with the dual caster wheels turned at the angle achieved during a minimum radius turn during use, one wheel will continue to support the roller and prevent it from dropping down.

It should be noted also that suitable scrapers can be placed adjacent the roller 71, and also between the wheels 55 and 56 to keep the mud and dirt from building up on the surfaces of the tires on the wheels 55 and 56 and on the surface of the roller 71.

The details of mounting and downward loading of the furrow opener assemblies is shown in greater detail in my co-pending application Ser. No. 770,459, filed Feb. 22, 1977 for Down Pressure Control Mechanism For Grain Drills.

What is claimed is:

1. In an agricultural implement having a first shaft to be driven in relation to ground speed and including a frame, wheel means supporting said frame for movement over the ground including caster wheel means having dual wheels rotatable about a common generally horizontal axis and a support for said dual wheels pivotally mounted to said frame about an upright axis, said caster wheel means being free to pivot sufficiently to permit turning of said implement, a drive roller, means to support said drive roller relative to said frame adjacent said caster wheel means for rotation about an axis, said means to support including means to permit movement of said roller from a position spaced from said caster wheel means to position engaging said caster wheel means to rotationally drive said roller, means drivably connecting said roller to said first shaft, said drive roller having an axial length along its axis of rotation sufficient so said roller engages both of said dual wheels when the frame is moving in a normal direction of movement during working and continues to be driven as the caster wheel means caster during turning of the implement.

2. The combination as specified in claim 1 wherein said means mounting said roller comprises a pair of arms, one on each end of said roller, means to pivotally mount said arms with respect to said frame, and spring means connected between said frame and said arms to selectively urge said arms downwardly against said caster wheel means.

3. The combination as specified in claim 2 wherein said roller has a mounting shaft rotatably mounted on said arms, said means to pivotally mount said arms comprising said first shaft rotatably mounted on said frame.

4. The combination of claim 3, said means drivably connecting comprising a pair of rotation members, one mounted on each of said mounting shafts and said first shaft, and means to drivably link said rotating members whereby said arms may pivot without disabling said means to drivably link.

5. A drive mechanism for seeders such as a grain drill having a frame, wheel means supporting said frame for movement over the ground including caster wheel means adjacent the forward end of said frame, said caster wheel means including at least one wheel member and an upright shaft pivotally mounted to said frame which is free to swivel about the pivot axis of said shaft during operation to accommodate turning movement of said seeder, an elongated drive roller of length to span a width greater than the lateral width of said one wheel member, means to support said drive roller relative to said frame and independent of said caster wheel means, said means to support including means to permit movement of said roller from a position spaced from said caster wheel means to position engaging said caster wheel means whereby the roller is rotated by rotation of said caster wheel means, and means drivably connected to said roller to provide a drive for controlling the rate of seeding proportional with the speed of rotation of said roller as determined by rotation of said caster wheel means, said roller being of length to permit the caster wheel means to slide along said roller and to continue to rotate said roller as the caster wheel means caster during use.

6. The combination as specified in claim 6 wherein said caster wheel means comprises dual wheels laterally positioned side by side and mounted about a common caster axis, said roller means being of sufficient length along its axis of rotation to span the width of both of said dual wheels when axis of rotation of the caster wheel means is substantially parallel to the roller axis.

7. The combination as specified in claim 5 wherein said means mounting said roller comprises a pair of arms, one on each end of said roller, means to pivotally mount said arms with respect to said frame, and spring means connected between said frame and said arms to urge said arms downwardly against said caster wheel means.

8. The combination as specified in claim 7 wherein said means to mount said arms with respect to said frame comprises a shaft, means to rotatably mount said shaft relative to said frame, and means to rotatably mount each of said arms relative to said shaft whereby said shaft may rotate at the same time said arms pivot.

9. The combination as specified in claim 8 wherein said means drivably connected to said roller comprise rotating drive elements drivably mounted on the axis of rotation of said roller and on said shaft, respectively.

10. The combination as specified in claim 3 wherein said means to pivotally mount said arms to said frame comprises a rock shaft assembly, control lever means on said rock shaft assembly, and said spring means acting on said control lever means and urging said arms in direction to cause said roller to engage said caster wheel means under spring pressure when the rock shaft assembly is actuated to a working position.

11. The combination as specified in claim 10 and means carrying said spring means comprising a rod member connected to said control lever means, means mounting an opposite end of said rod member to an associated arm to permit said rod member to slide axially relative to said associated arm a limited amount when the rock shaft is moved in direction to load said spring and to urge said arm and roller toward said caster wheel means, and means on each rod member operable to engage and lift said associated arm when the rock shaft is moved in an opposite direction.

12. The combination as specified in claim 10 wherein said grain drill assembly includes furrow opener assemblies, means to control said furrow opener assemblies connected to said rock shaft assembly so that as said rock shaft assembly moves to urge the roller against said caster wheel means said furrow opener assemblies are moved into engagement with the ground.

* * * * *

UNITED STATES PATENT OFFICE
CERTIFICATE OF CORRECTION

Patent No. 4,117,891          Dated October 3, 1978

Inventor(s) Chester G. Neukom

It is certified that error appears in the above-identified patent and that said Letters Patent are hereby corrected as shown below:

Column 6, line 13, (Claim 6, line 1) "Claim 6" should be --Claim 5--; Column 6, line 18, (Claim 6, line 6) after "when" insert --the--; Column 6, line 37, (Claim 10, line 1) "Claim 3" should be --Claim 7--.

*Signed and Sealed this*

*Nineteenth* Day of *December 1978*

[SEAL]

Attest:

RUTH C. MASON
Attesting Officer

DONALD W. BANNER
Commissioner of Patents and Trademarks